United States Patent
Benavidez

(10) Patent No.: US 9,756,413 B1
(45) Date of Patent: Sep. 5, 2017

(54) CABLED DEVICE STORAGE ORGANIZER

(71) Applicant: Ivan Fabian Benavidez, Wesley Chapel, FL (US)

(72) Inventor: Ivan Fabian Benavidez, Wesley Chapel, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/873,965

(22) Filed: Oct. 2, 2015

Related U.S. Application Data

(60) Provisional application No. 62/058,762, filed on Oct. 2, 2014.

(51) Int. Cl.
| | | |
|---|---|---|
| H04R 25/00 | (2006.01) | |
| H04R 1/10 | (2006.01) | |
| H02G 11/00 | (2006.01) | |

(52) U.S. Cl.
CPC ........... *H04R 1/1033* (2013.01); *H02G 11/00* (2013.01)

(58) Field of Classification Search
CPC .......................... H04R 1/1033; H04R 1/1016
USPC ......................................... 381/370, 374, 384
See application file for complete search history.

(56) References Cited

U.S. PATENT DOCUMENTS

| | | | | |
|---|---|---|---|---|
| 5,845,197 | A * | 12/1998 | Hada ...................... | G11B 31/00 379/430 |
| 7,436,974 | B2 * | 10/2008 | Harper ................. | H04R 1/1033 381/374 |
| 8,269,111 | B2 | 9/2012 | Scifo et al. | |
| 2005/0220319 | A1 | 10/2005 | Chan et al. | |
| 2011/0290532 | A1 | 12/2011 | Cano, Jr. | |
| 2012/0170787 | A1 | 7/2012 | Staley | |

* cited by examiner

*Primary Examiner* — Sunita Joshi
(74) *Attorney, Agent, or Firm* — Molly L. Sauter; Smith & Hopen, P.A.

(57) ABSTRACT

A cabled device storage organizer that addresses the common problem of organizing and storing personal cabled items, such as an audio headset, and prevents entanglement of the cables. In one embodiment, an audio headset storage organizer includes a main body having an interior cavity extending the length of the main body, the interior cavity dimensioned to receive a cable of a audio headset and two apertures formed on an exterior of the main body, each of the two apertures dimensioned to receive one of two audio earbuds attached to the cable of the audio headset.

19 Claims, 6 Drawing Sheets

CABLED DEVICE STORAGE ORGANIZER

BACKGROUND OF THE INVENTION

Entanglement of wires and cables of personal cabled devices, such as audio headsets having earbud or ear-canal type audio earphones, is a common problem for users. Entanglement of the cables may result in inadvertent damage to the headset and untangling the cables once they have become entangled is time consuming and frustrating for the user.

Accordingly, there is a need in the art for an apparatus adapted for the organizing and storing of personal cabled devices, such as audio headsets, which prevents cable entanglement and/or protects the heatset from damage.

SUMMARY OF INVENTION

The present invention provides a solution to the common problem of organizing and storing personal cabled devices, such as audio headsets, and prevents entanglement of the cabled devices.

In one embodiment, a cabled device organizer is provided which includes a main body having an interior cavity extending the length of the main body, the interior cavity dimensioned to receive a cable of a cabled device and two apertures formed on an exterior of the main body, each of the two apertures dimensioned to receive one of two units attached to the cable of the cabled device.

In a particular embodiment, the cabled device is an audio headset and the two units are audio earbuds.

The cabled device organizer may further include a remover top cover and/or a removable bottom cover having an opening to receive the cable of the cabled device.

The cabled device storage apparatus of the present invention is adaptable to any size cable, and provided that the cable storage apparatus is properly scaled up in size with consideration for the length and thickness, is adaptable to accommodate the cable for the intended use.

The cable and headset storage organizer is both a functional storage device for headphones as well as a well-crafted wearable necklace. The headphone organizer addresses the problem of entanglement and damage that occurs when storing a headphone set without the use of such an organizer.

The headphone organizer allows people to both quickly store the headphone and also quickly release it by effortlessly uncurling the headphone cable from the headphones storage apparatus without separating the headphones apart and without wasting time.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

The present invention provides a solution to the common problem of organizing and storing personal cabled items, such as audio headsets, and preventing entanglement of the cable of the headset.

In general, a cabled device organizer in accordance with the present invention includes a main body having an interior cavity extending the length of the main body, wherein the interior cavity is dimensioned to receive a cable of a cabled device, and two apertures formed on an exterior of the main body, each of the two apertures dimensioned to receive one of two units attached to the cable of the cabled device. In a particular embodiment, the cabled device may be an audio headset and the two units attached to the cable are audio earbuds.

Figure 1:
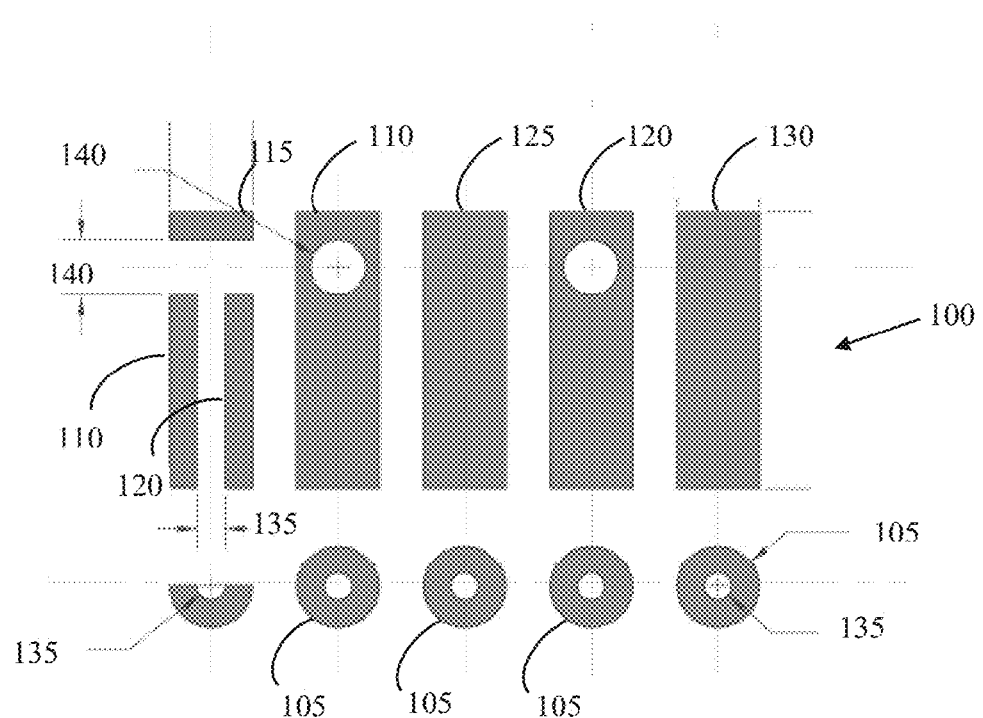
FIG. 1 is an illustration of a cross-sectional view of an embodiment of the cabled device storage organizer of the present invention.

With reference to FIG. 1, vertical cross-sections of the components comprising the cabled device storage organizer are illustrated. The main body 100 of the cable device storage organizer is formed of a right side 110, a front side 125, a left side 120 and a back side 130. In this embodiment, the main body 100 of the cabled device storage organizer is a hollow column having a substantially circular bottom cover 105 attached to the bottom of the hollow column 100 and dimensioned to enclose the interior cavity of the main body 100, thereby forming a cylindrical body. However, the main body 100 may also be formed by a hollow column having a square, rectangular, triangular or any other of a variety of base shapes, thereby forming a column of a variety of shapes. The base 105, or bottom cover, of the cabled device storage organizer has an opening 135 dimensioned to receive the cable of the cabled device. The bottom cover 135 is secured to the main body 100 to form a passageway through the center of the hollow column of the main body 100.

The cabled device organizer further includes two apertures 140 formed in the sides 110, 125 of the main body 100. In this embodiment, the apertures 140 are positioned towards a top portion of the column, however, other placements of the apertures 140 are within the scope of the present invention. In one embodiment, the two apertures 140 are positioned substantially opposite each other on the main body 100. The cabled device storage organizer additionally includes a top cover 115 secured to the top end of the main body 100 to cover the opening of the hollow column. The bottom cover 105 and the top cover 115 may be integral with the main body 100, or alternatively them may be fabricated separately and attached to the column by various means known in the art.

In one specific embodiment, the main body 100 of the cabled device storage organizer is a hollow cylinder approximately ½ to 1½ of an inch in diameter with a height varying from a minimum of approximately 1 inch to a maximum of approximately 4 inches. The passageway through the hollow cylinder extends from approximately ¼ inch from the top end of the cylinder and runs parallel to the long vertical axis of the cylinder 100. The cylinder has an opening 135 in the bottom cover 105 and a top cover 115 with two apertures 140 positioned substantially horizontally opposite each other and about ¼ inch below the top cover 115. The apertures 140 allow a transmission wire of a cabled device, such as a set of headphones, to be inserted through the apertures 140 and fed down through the center of the cylinder 100, towards the opening 135 in the bottom cover 105 of the cylinder. Thus, the transmission wire of the headphones is fed all the way down through the cylinder 100 until both of the earpieces abut the apertures 140 of the cabled device storage organizer. In a particular embodiment, one earpiece of the headphones in positioned within an aperture on one side of the cylinder while the other earpiece is positioned in the aperture on the opposing side. Once the transmission wire is completely fed through the passageway of the cylinder and both of the earpieces are opposing each other at the top of the cylinder, they will be half way inserted into the vertical shaft and halfway into the horizontal perforation, snugly locked in place.

Figure 2:
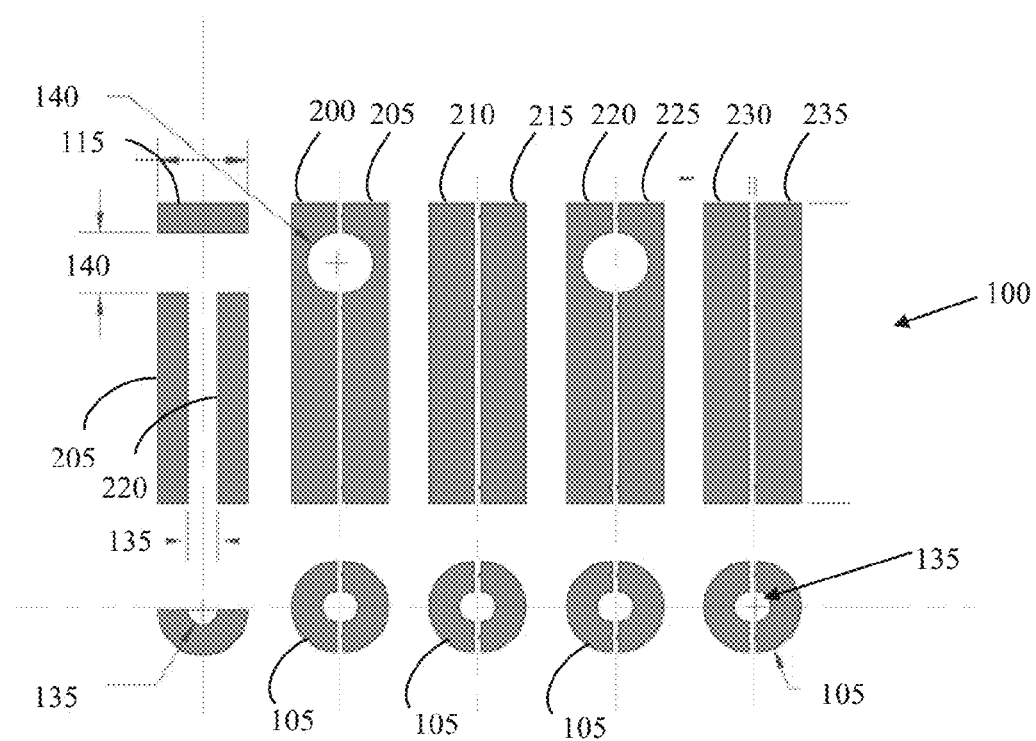
FIG. 2 is an illustration of a cross-sectional view of an embodiment of the cabled device storage organizer of the present invention, wherein the main body of the organizer is formed of two separate portions.

In an additional embodiment, as shown with reference to FIG. 2, the main body 100 of the cabled device storage organizer is comprised of two separate halves that are coupled together after the cable of the cabled device has been positioned within the interior of the main body 100. In this embodiment the two separate halves are defined along a vertical axis of the main body 100. As such, the right side is formed of two separate portions 200, 205, the left side is formed of two separate portions 210, 215, the left side is formed of two separate portions 220, 225 and the back side is formed of two separate portions 230, 235. As illustrated the bottom cover 105 may be integral with the main body and may also be configured to be two separation portions. This embodiment allows for the insertion of cables and earpieces that are larger than the apertures 140 formed in the main body 100 to be placed within the passageway of the organizer. The two separate halves of the main body may be snapped together or alternatively, may be attached by another type of fastener known in the art.

Figure 3:
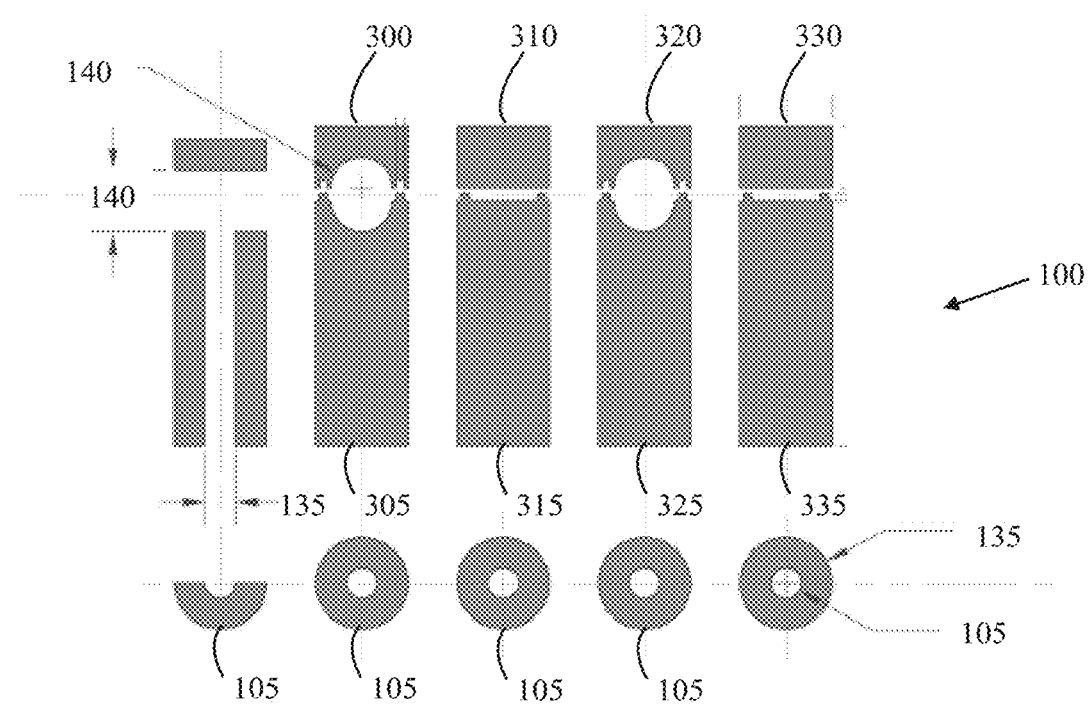
FIG. 3 is an illustration of a cross-sectional view of an embodiment of the cabled device storage organizer of the present invention, wherein the top portion of the organizer is removable.

As shown with reference to FIG. 3, in an additional embodiment, the main body 100 is formed of a top portion that is separate from a bottom portion. In this embodiment, a top portion of the main body 100 of the cabled device storage organizer is removable to allow for the insertion of the cable of the cabled device through the top of the passageway instead of through one or another of the apertures 140 in the column. In this embodiment the two separate halves are defined along a horizontal axis of the main body 100. As such, the right side is formed of two separate portions 300, 305, the left side is formed of two separate portions 310, 315, the left side is formed of two separate portions 320, 325 and the back side is formed of two separate portions 330, 335. As illustrated the bottom cover 105 may be integral with the main body and the top cover 115 may be integral with the separate top portion of the main body. This embodiment allows for a cabled device having earpieces that are larger than the apertures 140 to be stored in the organizer. In this embodiment, the removable top portion is removed and after the cable of the cabled device has been fed through the passageway of the column, the top portion is repositioned to cover the top opening of the column and to secure the earpieces in the area of the aperture 140.

Figure 4A:
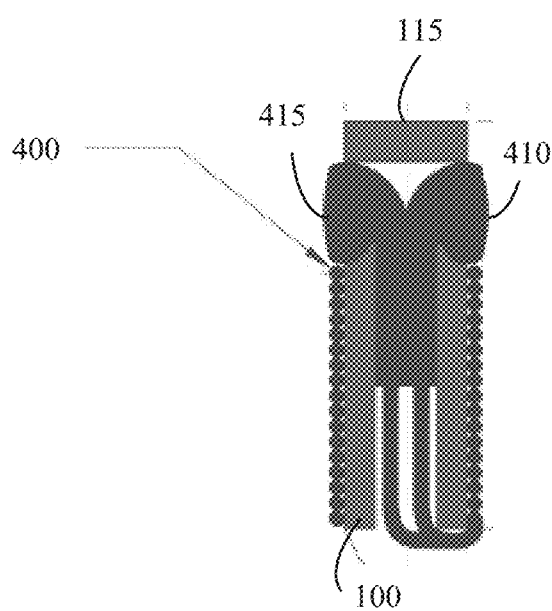
FIG. 4A is an illustration of a cross-sectional view of an embodiment of the cabled device storage organizer of the present invention showing the headphones in a stored position.
Figure 4B:
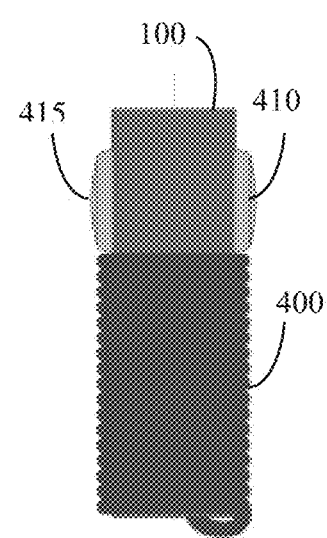
FIG. 4B is an illustration of an embodiment of the cabled device storage organizer of the present invention showing the headphones in a stored position.

FIG. 4A illustrates a cross-section of the headphones when they are stored in the cabled device storage organizer comprising a main body 100 and a top cover 115. As shown, the earpieces 410, 415 are positioned within the apertures of the main body 100 and the transmission wire or cable 400 of the headphones extends through the bottom of the main body 100. In this embodiment, the cable 400 is shown wrapped around the main body 100 of the storage organizer. FIG. 4B illustrates a view of the headphones in a storage position within the cabled device storage organizer, wherein the earbuds 410, 415 are positioned in the apertures formed on the main body 100 and the cable 400 of the headphones is wrapped around an exterior of the main body 100. In a particular embodiment, there may be a vertical notch formed at the bottom end of the main body 100 to aid in the initial wrapping of the cable 400 around the outside of the main body 100 of the storage organizer.

Figure 5:
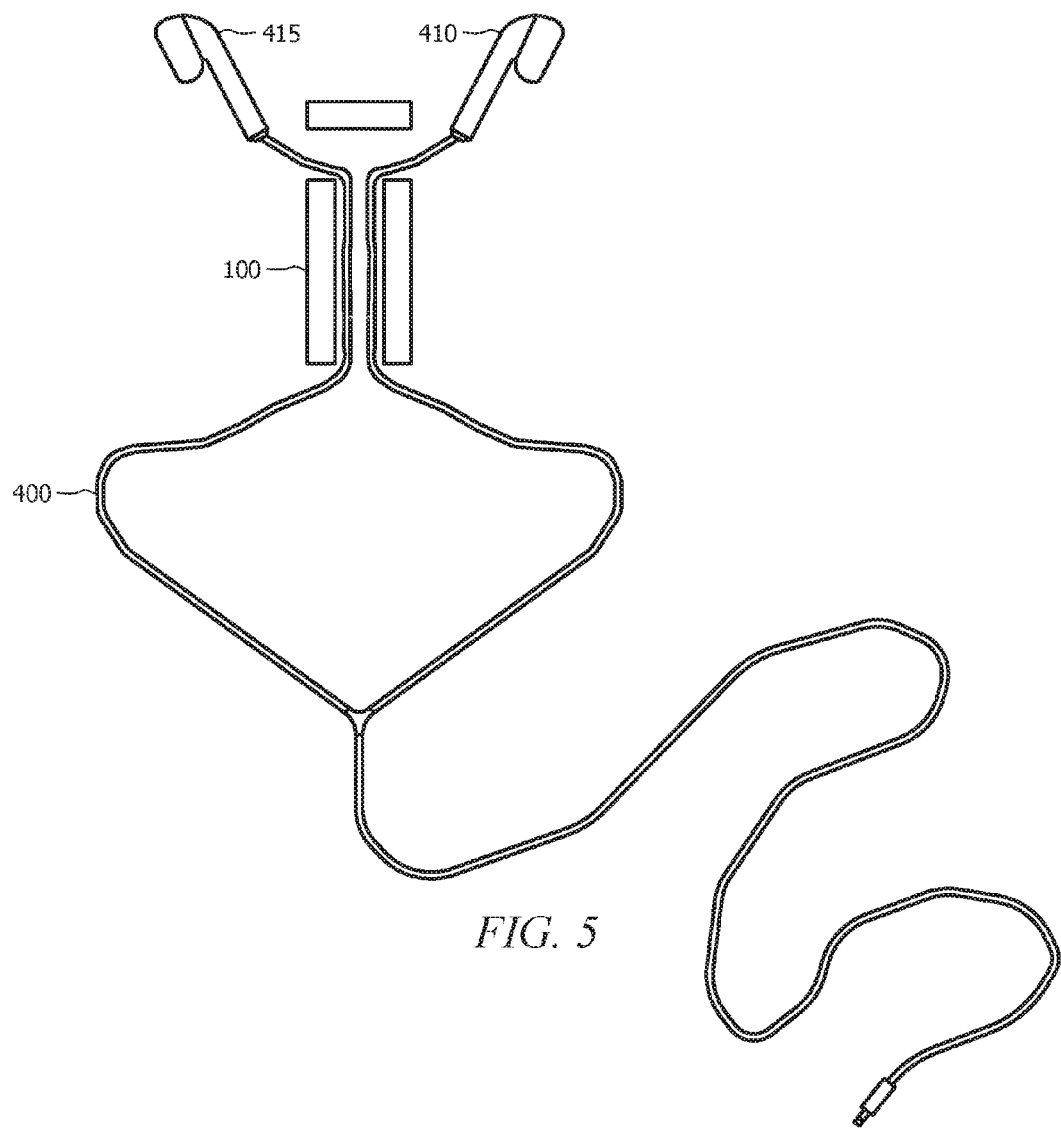
FIG. 5 is an illustration of a cross-sectional view of an embodiment of the cabled device storage organizer of the present invention showing the headphones prior to engagement with the apertures of the main body of the organizer.

FIG. 5 illustrates a vertical cross-section of cabled device storage organizer, comprising a main body 100 and a top cover 115, and a set of headphones illustrating the insertion of the transmission wire or cable 500 of the headphones through the passageway of the main body 100 of the storage organizer, prior to the engagement of the earpieces 510, 515 of the headphones in the main body apertures.

Figure 6:
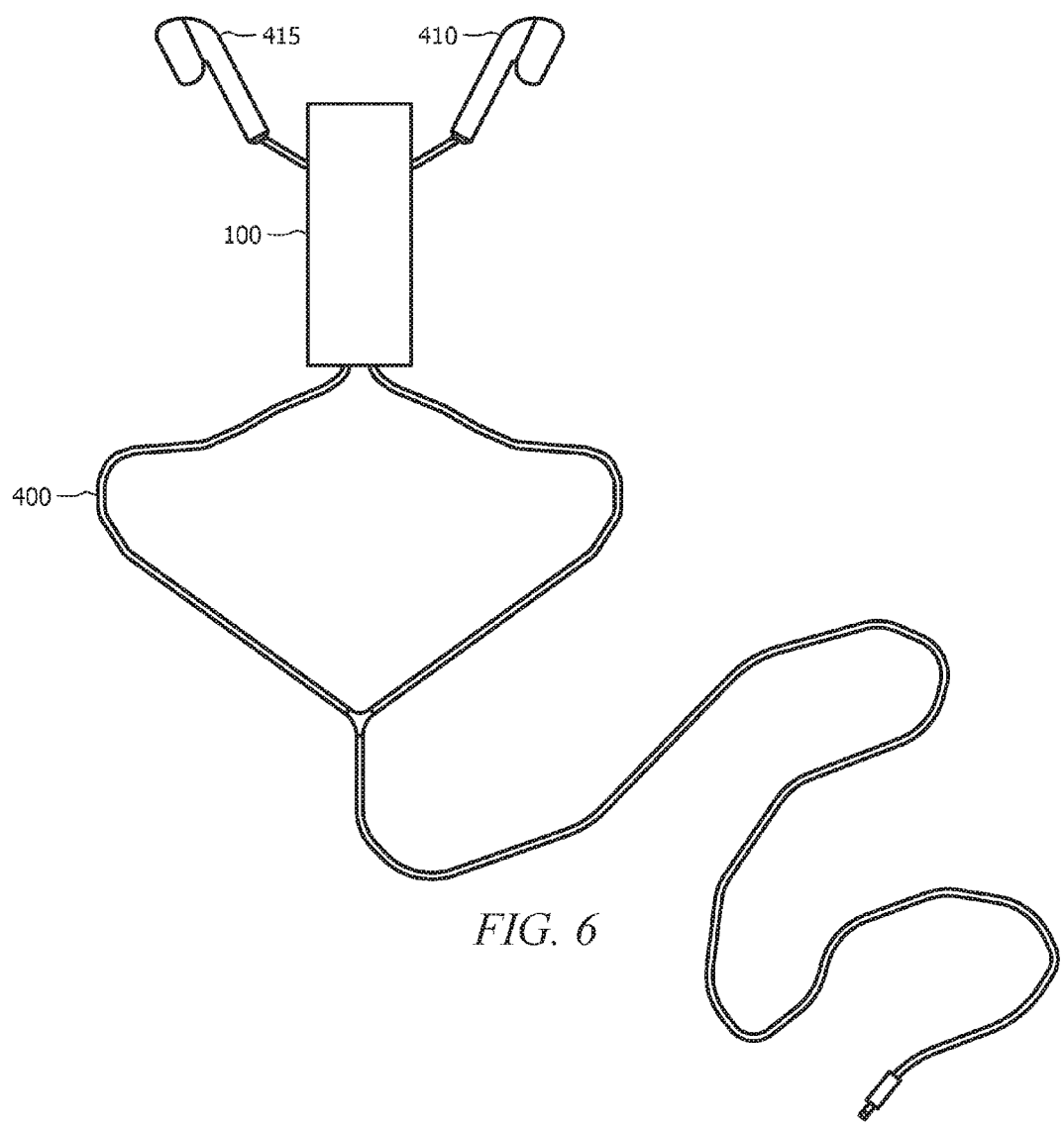
FIG. 6 is an illustration of an embodiment of the cabled device storage organizer of the present invention showing the headphones prior to engagement with the apertures of the main body of the organizer.

FIG. 6 illustrates the cabled device storage organizer and a set of headphones illustrating the insertion of the transmission wire or cable 600 of the headphones through the passageway of the main body 100 of the storage organizer, prior to the engagement of the earpieces 610, 615 of the headphones in the main body apertures and prior to wrapping the cable around the main body 100.

The body of the cabled device storage organizer may be fabricated of wood, plastic, metal, or composite material. The exterior surface may be decorated, undecorated, carved, perforated, colored, stained or threaded as a piece of jewelry.

The cabled device storage organizer may encompass a theme. In a particular embodiment, the cabled device storage organizer may additionally comprise a face and/or be representative of a character, in which case the earpieces would play the role of the eyes.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A cabled device organizer comprising:
a main body having an interior cavity extending the length of the main body, the main body having an opening at a first end and an opening at an opposite second end and the interior cavity of the main body being dimensioned to receive a cable of a cabled device, wherein the cabled device further comprises two units attached to at a first end of the cable of the cabled device and wherein the two units and the first end of the cable are positioned to extend from the opening at the first end of the interior cavity of the main body and a second end of the cable, opposite the first end of the cable, is positioned to extend from the opening at the second end of the interior cavity of the main body; and two apertures formed within an exterior surface of the main body, proximate to the first end of the main body, each of the two apertures dimensioned to receive one of the two units attached to the first end of the cable of the cabled device.

2. The cabled device organizer of claim 1, wherein the cabled device is an audio headset and the two units are audio earbuds.

3. The cabled device organizer of claim 1, further comprising a first cover secured to the first end of the main body, the first cover dimensioned to enclose the interior cavity of the main body at the first end.

4. The cabled device organizer of claim 3, wherein the first cover is removable.

5. The cabled device organizer of claim 3, wherein the first cover is substantially circular.

6. The cabled device organizer of claim 1, further comprising a second cover secured to the second end of the main body, the second cover dimensioned to enclose the interior cavity of the main body at the second end and the second cover including an opening dimensioned to receive the cable of the cabled device.

7. The cabled device organizer of claim 6, wherein the second cover is removable.

8. The cabled device organizer of claim 6, wherein the second cover is substantially circular.

9. The cabled device organizer of claim 1, wherein the main body is substantially cylindrical.

10. The cabled device organizer of claim 1, wherein the main body is comprised of two separate portions coupled together to form the main body.

11. The cabled device organizer of claim 10, wherein the two separate portions are defined by a division along a vertical axis of the main body.

12. The cabled device organizer of claim 11, wherein the two separate portions are defined by a division along a horizontal axis of the main body.

13. The cabled device organizer of claim 1, wherein the two apertures are substantially circular.

14. The cabled device organizer or claim 1, wherein the two apertures are positioned substantially opposite each other on the main body and are substantially aligned with each other.

15. The cabled device organizer of claim 1, wherein the two apertures are larger than the earpiece of the cabled device.

16. The cabled device organizer of claim 1, wherein the two apertures are smaller than the earpiece of the cabled device.

17. The cabled device organizer of claim 1, further comprising a groove around the exterior perimeter of the main body, the groove dimensioned to receive the cable of the cabled device.

18. An audio headset device organizer comprising:
a main body having an interior cavity extending the length of the main body, the main body having an opening at a first end and an opening at an opposite second end and the interior cavity of the main body being dimensioned to receive a cable of an audio headset, wherein the audio headset further comprises two audio earbuds attached at a first end of the cable of the audio headset and wherein the two earbuds and the first end of the cable are positioned to extend from the opening at the first end of the interior cavity of the main body and a second end of the cable, opposite the first end of the cable, is positioned to extend from the opening at the second end of the interior cavity of the main body; and
two apertures formed within an exterior of the main body, proximate to the first end of the main body, each of the two apertures dimensioned to receive one of the two audio earbuds attached to the first end of the cable of the audio headset.

19. An audio headset device organizer comprising:
a main body having an interior cavity extending the length of the main body, the main body having an opening at a first end and an opening at an opposite second end and the interior cavity of the main body being dimensioned to receive a cable of an audio headset, wherein the audio headset further comprises two audio earbuds attached at a first end of the cable of the audio headset and wherein the two earbuds and the first end of the cable are positioned to extend from the opening at the first end of the interior cavity of the main body and a second end of the cable, opposite the first end of the cable, is positioned to extend from the opening at the second end of the interior cavity of the main body; and
two apertures formed within an exterior of the main body, proximate to the first end of the main body, each of the two apertures dimensioned to receive one of the two audio earbuds attached to the first end of the cable of the audio headset;
a first cover secured to the first end of the main body, the first cover dimensioned to enclose the interior cavity of the main body at the first end; and
a second cover secured to the second end of the main body, the second cover dimensioned to enclose the interior cavity of the main body at the second end and the second cover including an opening dimensioned to receive the cable of the audio headset.

* * * * *

UNITED STATES PATENT AND TRADEMARK OFFICE
CERTIFICATE OF CORRECTION

PATENT NO.        : 9,756,413 B1
APPLICATION NO.   : 14/873965
DATED             : September 5, 2017
INVENTOR(S)       : Ivan Fabian Benavidez It is certified that error appears in the above-identified patent and that said Letters Patent is hereby corrected as shown below:

In the Claims

Column 4, Claim 1, Line 64 should read:
cabled device further comprises two units attached at Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*